United States Patent [19]
Bradley

[11] 3,812,433

[45] May 21, 1974

[54] FREQUENCY DIFFERENCE MEASURING AND COMPENSATING CIRCUIT

[76] Inventor: Frank R. Bradley, 9 Dash Pl., Bronx, N.Y. 10463

[22] Filed: May 9, 1973

[21] Appl. No.: 358,663

[52] U.S. Cl. .................... 328/155, 328/133, 324/82
[51] Int. Cl. ............................................ H03b 3/04
[58] Field of Search ............ 328/133, 155; 307/262; 324/82

[56] References Cited
UNITED STATES PATENTS

| | | | |
|---|---|---|---|
| 3,293,547 | 12/1966 | Weissker | 307/262 X |
| 3,430,148 | 2/1969 | Miki | 328/133 |
| 3,548,296 | 12/1970 | Sundstrom | 328/155 X |
| 3,593,160 | 7/1971 | Moore | 328/155 X |
| 3,601,708 | 8/1971 | Stempler | 328/155 |
| 3,667,031 | 5/1972 | Cox | 328/155 X |

*Primary Examiner*—John S. Heyman
*Attorney, Agent, or Firm*—Gottlieb Rackman Reisman & Kirsch

[57] ABSTRACT

There is disclosed a circuit for measuring the frequency difference of two signals of the forms $\cos(wt+st)$ and $\cos(wt)$. A feedback signal $\theta$ is derived, and this feedback signal is operated upon together with the first input signal to derive a signal of the form $\cos(wt+st-\theta)$. This derived signal is compared to the second input signal in a phase comparator whose output is connected to the input of a high-gain amplifier. The amplifier output is the $\theta$ signal used in the first instance. Because of the employment of a high-gain amplifier in the loop, the output of the phase comparator is nulled. This, in turn, forces the two signals operated upon by the phase comparator to be equal so that $\theta=st$. By differentiating the $\theta$ signal, the frequency difference $s$ can be derived. The same "phase-chasing" technique can be employed not only to measure the frequency shift introduced by a transmission channel to a complex signal but also to compensate for that frequency shift and for phase intercept distortion as well.

3 Claims, 5 Drawing Figures

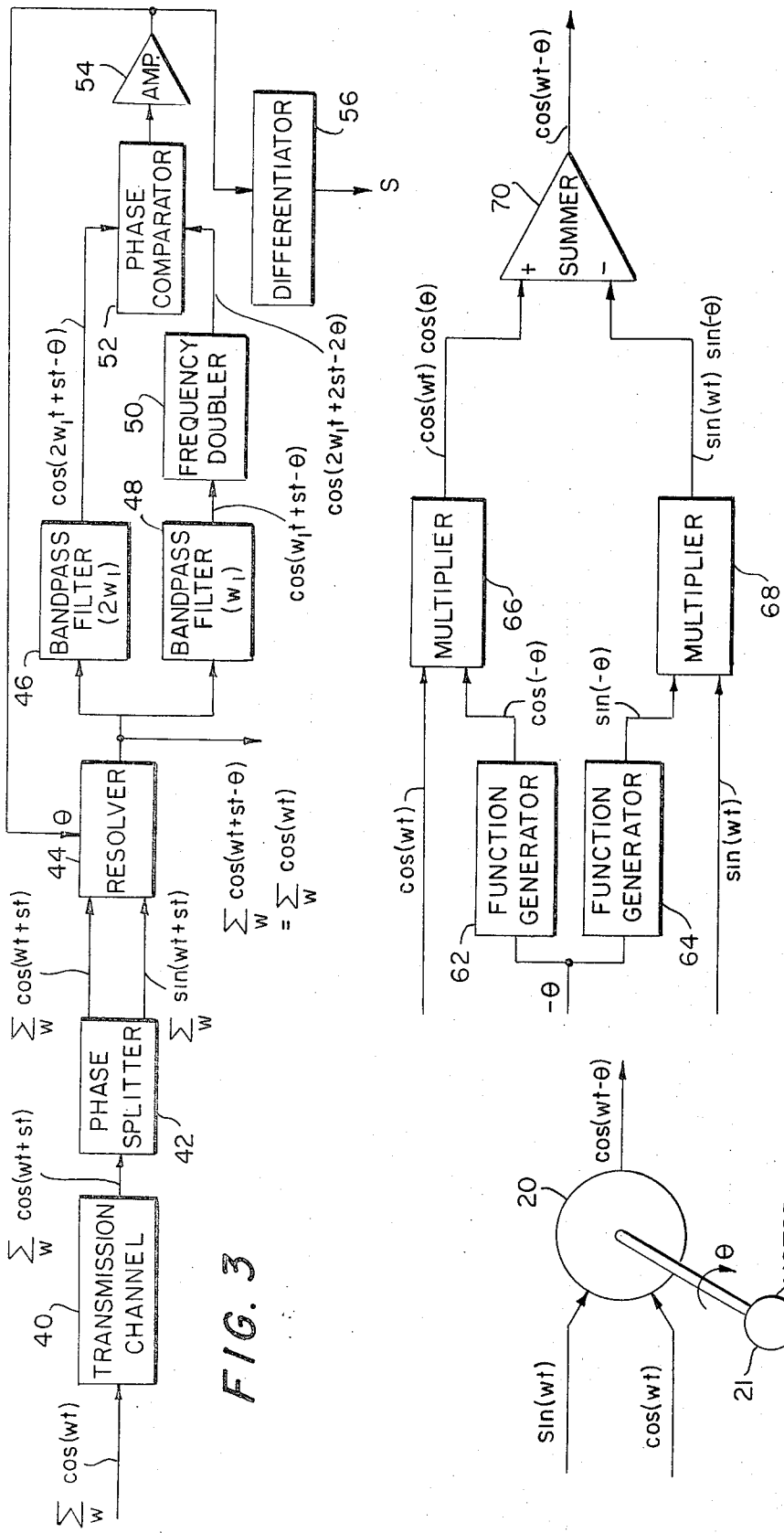

FREQUENCY DIFFERENCE MEASURING AND COMPENSATING CIRCUIT

This invention relates to frequency difference measuring and compensating circuits, and more particularly to such circuits which are highly accurate, capable of fast response and relatively simple to construct.

There are many situations in which it is necessary to measure the difference between two nearly equal frequencies, or the difference in ratio of two frequencies from a predetermined ratio, or to compensate for the difference. In frequency division multiplex communications systems, for example, the frequency of a local oscillator is compared to an incoming pilot frequency to which it is normally phase locked. The frequency deviation between the free running (non-controlled) local oscillator and the incoming pilot is adjusted to be zero. In this way a loss of pilot frequency will not interrupt the communication channel because the frequency of the free-running oscillator will be close enough to the pilot frequency.

Another example of the need to measure a frequency difference relates to the measurement of frequency shift in a communication channel. In such a case, a pair of frequencies such as 1-kHz and 2kHz are transmitted. The frequency difference between the 1-kHz signal after it is doubled at the receiving end, and the 2-kHz signal as it is received, is a measure of the frequency shift or trnaslation error in the link.

Prior art techniques for the measurements of small frequency differences involve either frequency counters (in which zero crossings which occur during a predetermined time interval are counted), or heterodyne schemes which measure a beat frequency. Prior art circuits are often costly, inaccurate and provide slow response. For example, in order to resolve a 1/20-Hz frequency difference between two signals, the measurement period must extend for twenty seconds in the absence of initial frequency multiplication.

It is a general object of my invention to provide circuits for measuring frequency differences, which circuits are accurate, relatively inexpensive to construct, provide continuous information, and are capable of fast response. It is another object of my invention to utilize such circuits to compensate for frequency and even phase shifts in signals transmitted along a communication channel, i.e., to eliminate "phase intercept distortion."

Briefly, in accordance with the principles of my invention, I utilize a "phase-chasing" circuit to operate upon two signals whose frequencies may be different. One of the signals has its phase continuously changed so that the signals are "locked" to each other even though their frequencies remain different. This technique is different from the conventional phase-locked loop technique (in which the frequency of an oscillator is changed) in that the frequencies are not changed but their relative phases are made to vary. The signals can be locked to each other because of the inherent relationship between the phase and frequency of a periodic signal; the derivative of phase is a frequency function. The "phase-chasing" technique can be used both to measure frequency differences and to compensate for frequency and phase changes.

Further objects, features and advantages of my invention will become apparent upon consideration of the following detailed description in conjunction with the drawing, in which:

FIG. 3 depicts the manner in which the frequency and phase shifts introduced by a transmission line can be measured in the case of complex signals, the system also serving to compensate for the frequency and phase shifts to derive an overall frequency-untranslated signal with zero phase intercept distortion;

FIG. 4 depicts an electromechanical "resolver" which can be used in the circuits of FIGS. 1 and 3; and FIG. 5 depicts an electronic "resolver" which can be used in the same circuits.

Figure 1:
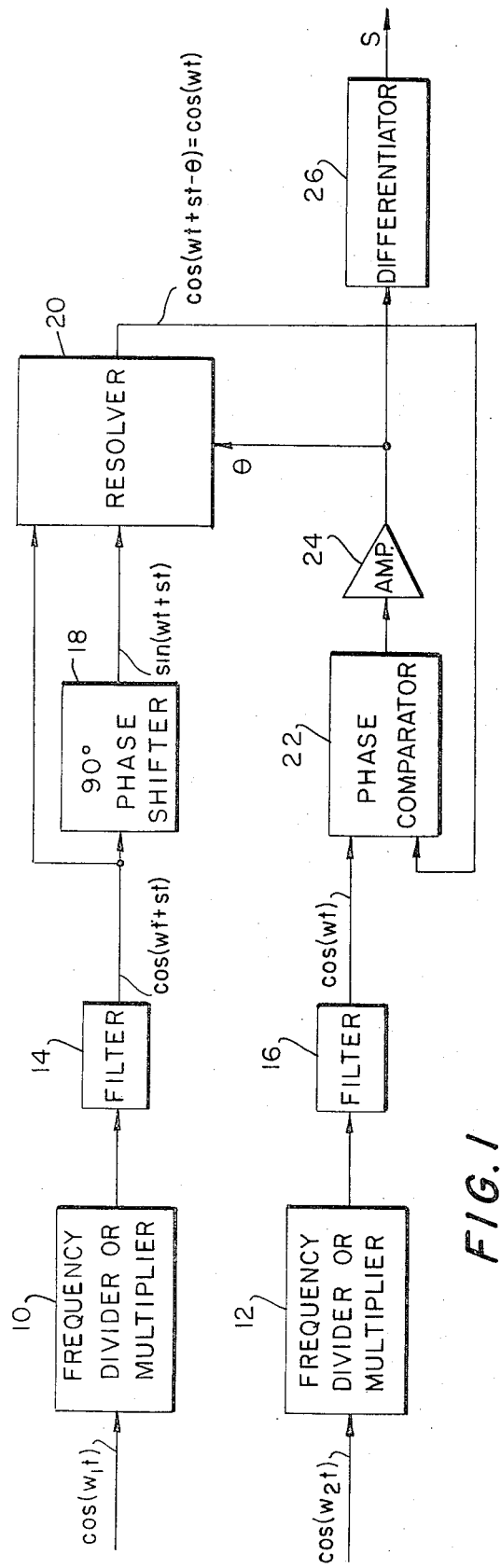
FIG. 1 depicts an illustrative embodiment of my invention in which the frequency difference between two single-frequency input signals is measured.

The two input signals to the circuit of FIG. 1 have respective frequencies (in radians) of $w_1$ and $w_2$. Each of these signals may be extended to a frequency divider or a frequency multiplier 10, 12 and through one of the filters 14, 16. The manner in which the two signals are processed at the input stage of the circuit of FIG. 1 is not a critical aspect of my invention. As shown in FIG. 1, the output of filter 16 is a signal having a circular frequency $w$, and the output of filter 14 is a signal of slightly different circular frequency $(w+s)$. The circuit of FIG. 1 functions to measure the frequency difference $s$. The two input frequencies $w_1$ and $w_2$ need not be equal; the purpose of the frequency dividers or multipliers is to derive two frequencies which are more or less equal. The "input processing" can take many forms depending upon the particular application in which a signal frequency must be measured. Although the circuit of FIG. 1 operates to measure even large frequency differences, that is, it can operate on signals whose frequency difference is large, the usual application in which it is necessary to measure a frequency difference involves two nearly equal frequencies. Accordingly, in the usual case $s$ is a small percentage of $w$.

Phase shifter 18 functions to develop a quadrature component of the $\cos(wt + st)$ signal. The two signals, identical except for a phase difference of 90°, are applied to the two inputs of resolver 20. The resolver may be an electromechanical device or an electronic device, but in either case its third input is an angular measurement labeled $\theta$. The resolver function to derive an output signal $\cos(wt + st - \theta)$, as shown in FIG. 1. (For reasons which will become apparent below, by virtue of a feedback connection, $\theta$ is continuously adjusted to be equal to $st$ so that the resolver output chases the phase of the $\cos(wt)$ input signal.) Although the system of FIG. 1 utilizes a resolver, any circuit equivalent to elements 18 and 20 can be used. Such a circuit simply must function to shift the phase of an input signal $\cos(wt + st)$ by the phase angle $\theta$.

The second input signal $\cos(wt)$ is applied to one input of phase comparator 22, and the output of the resolver is applied to the second input of the comparator. The phase comparator generates an output signal which is proportional to the difference between the phases of the signals at its two inputs. The difference signal is applied to the input of high-gain amplifier 24, whose output signal is applied to the $\theta$ input of the resolver.

Since the high-gain amplifier is provided in the feedback path from the output of the resolver to its $\theta$ input, the amplifier output is automatically adjusted to a level $\theta$ such that the output of the phase comparator is at a null. In other words, because of the very high gain of the amplifier, even a neglible signal level at its input can control the generation of a $\theta$ signal of the proper magnitude to force the two inputs of the comparator to be in phase. Since the feedback circuit functions to force the output of the resolver to "chase" the input $\cos(wt)$, it is apparent that the phase of $\cos(wt + st - \theta)$ equals the phase of $\cos(wt)$, or $\theta = st$.

Therefore, if the $\theta$ signal is differentiated, its derivative is equal to the difference frequency $s$. This frequency difference is derived in FIG. 1 by employing differentiator 26 to differentiate the $\theta$ signal. The output $s$ represents the difference between the two input frequencies.

It should be noted that the $\theta$ signal is a periodic one. With an electromechanical resolver the periodicity is automatically inserted by the resolver. An electronic equivalent must have this same characteristic and this must be done with functionally equivalent switching because voltage representations cannot grow indefinitely, as can the shaft angle of an electromechanical resolver. These two types of resolvers will be discussed below.

The phase comparator 22 is a conventional circuit having both an acquisition and a tracking mode. In the acquisition mode the comparator provides direction information; when the resolver has reached the correct speed (and direction), the comparator functions as a pure phase comparator. The invention differs from a conventional phase lock loop in that lock is achieved between two nominally unequal frequencies, without changing either of them, by the introduction of a controlled continuous phase shift.

As described above, in many applications a pair of signals may be subjected to processing prior to the actual measurement of the difference between the frequencies of two signals. For example, suppose that the input frequencies $w_1$ and $w_2$ are nominally 2,048 Hz and 128 Hz (in radians), that is, the ratio between the two input frequencies is expected to be 16. Suppose, however, that the actual signals operated upon are $\cos(128t)$ and $\cos(204t + et)$. If the higher-frequency signal is passed through a frequency divider which reduces its frequency by a factor of 16, while the lower frequency signal has its frequency left unchanged, the two input signals whose frequency difference is actually measured are $\cos(128t)$ and $\cos(128t + et/16)$. In this case, $s = e/16$, and the deviation $e$ of the higher-frequency signal, relative to the lower-frequency signal, is determined by multiplying the output $s$ by a factor of 16.

FIG. 4 illustrates an electromechanical resolver suitable for use in FIG. 1. Such a resolver 20 is a standard component well known in the art. Its two electrical inputs have applied to them signals of the form $\sin(wt)$ and $\cos(wt)$. The resolver is provided with a shaft which is rotated to a continuously changing angle $\theta$ by a motor 21. The motor is energized by an electrical signal $\theta$ applied at its input. Depending on the angular position of the shaft, the electrical output of the resolver is $\cos(wt - \theta)$.

Another circuit which can be used for resolver 20 of FIG. 1 is shown in FIG. 5. This circuit is provided with the same inputs $\sin(wt)$ and $\cos(wt)$, but it requires an input $-\theta$, rather than $\theta$. The negative signal can be derived by utilizing an inverting amplifier 24 in FIG. 1 (in which case, the output $s$ is a negative measurement). The $-\theta$ signal is operated upon by two function generators 62, 64 to derive trigonometric signals $\cos(-\theta)$ and $\sin(-\theta)$. As previously mentioned, in the case of the electronic resolver switching must be incorporated in the function generators so that $\theta$ is equal to $st$ modulo $2\pi$. The derivative of $\theta$, of course, still equals $s$ since the derivative of a constant offset in zero. This switching entails having each function generator generate a ramp whose slope changes polarity when $\theta$ reaches an upper or lower limit so as to form a periodic triangular waveform which is then shaped by diode networks to approximate sine and cosine functions. Each of the signals $\cos(-\theta)$ and $\sin(-\theta)$ is multiplied by a respective one of the input signals $\cos(wt)$ and $\sin(wt)$, as shown, and the outputs of multipliers 66, 68 are respectively $\cos(wt)\cos(-\theta)$ and $\sin(wt)\sin(-\theta)$. These two signals are subtracted from each other in summer 70. It is apparent that, by reason of the identity function $\cos(A + B) = \cos(A)\cos(B) - \sin(A)\sin(B)$, the output of the summer is $\cos(wt - \theta)$ as required.

Although FIGS. 4 and 5 depict two circuits for achieving the function of resolver 20 in FIG. 1, many alternatives will be apparent to those skilled in the art. Phase shifter 18 and resolver 20 can be replaced by any sub-system which operates upon two inputs $\cos(wt + st)$ and $\theta$ to derive an output $\cos(wt + st - \theta)$.

Figure 2:
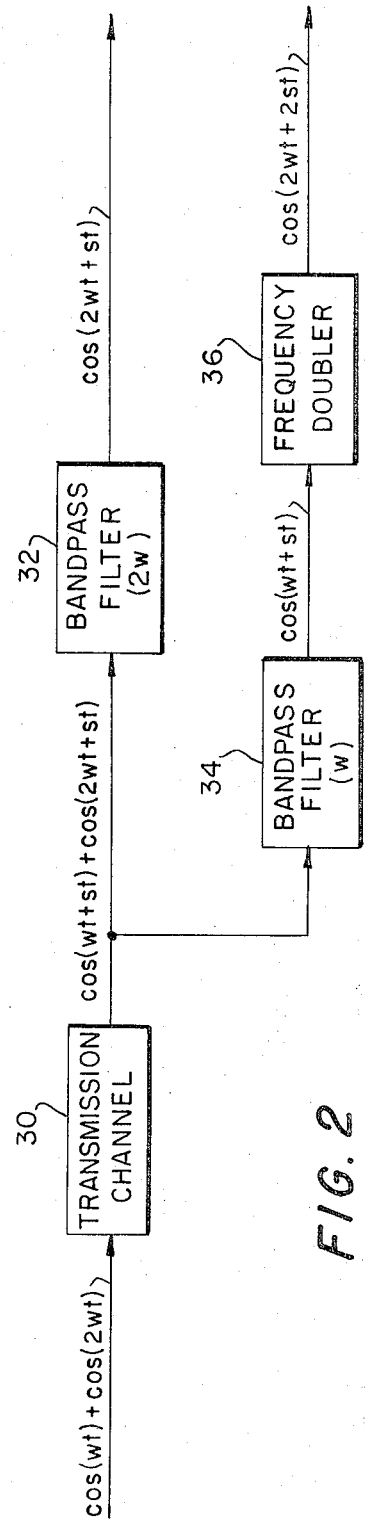
FIG. 2 depicts a conventional circuit for measuring frequency shift in a transmission link, the two output signals derived from the link being suitable for processing by a circuit such as that of FIG. 1.

FIG. 2 illustrates a typical application in which it is necessary to measure the difference in frequency between two signals. In order to determine the frequency shift introduced by a transmission channel 30, a signal of the form $\cos(wt) + \cos(2wt)$ is transmitted through the channel. Since each signal frequency is shifted by the same value $s$ as it traverses down the channel, the signal at the output of the channel is of the form $\cos(wt + st) + \cos(2wt + st)$. This two-component signal is transmitted through bandpass filter 32 which is provided with a narrow bandpass centered at frequency $2w$. The filter thus filters out the first component in the received signal, and the output of the filter is $\cos(2wt + st)$.

The received signal is also transmitted through bandpass filter 34 which also has a narrow bandpass, but one which is centered at a frequency $w$ rather than a frequency $2w$. Consequently, the filter filters out the second term in the received signal, and its output is $\cos(wt + st)$. Frequency doubler 36 functions to double the frequency of the signal at the output of filter 34 to derive a signal of the form $\cos(2wt + 2st)$.

If the two output signals $\cos(2wt + st)$ and $\cos(2wt + 2st)$ are now compared to each other, it is apparent that they differ in frequency by a value $s$. Consequently, one of these signals can be applied to the input of phase shifter 18 and resolver 20 in FIG. 1, and the other signal can be applied to an input of phase comparator 22, with the circuit of FIG. 1 providing a measurement of the difference frequency $s$ at its output.

The reason for transmitting two different signals down the transmission channel of FIG. 2 is that in this way there is no need at the receiving end for an oscillator whose frequency is identical to that of the originally transmitted signal. Of course, if such an oscillator is provided, then all that is required is to compare the frequency of the received signal to the frequency of the oscillator to determine the frequency shift introduced by the channel. But because it is difficult to maintain oscillators at two different locations with identical frequencies, what is transmitted down the channel is a composite signal, one of whose components has a frequency exactly double the frequency of the other. Although the base frequency may vary slightly, by providing the two filters and the frequency doubler at the receiving end, there can be derived two signals whose frequencies differ from each other by the frequency shift introduced by the channel. All that is required to determine the value $s$ is to measure the difference in the two frequencies, and this can be accomplished rapidly by the circuit of FIG. 1. In fact, because a feedback loop is provided in the circuit of FIG. 1, even if the frequency shift characteristic of the channel changes continuously, the output $s$ of the circuit of FIG. 1 follows this change on a continuous basis.

The basic "phase-chasing" feedback technique of FIG. 1 has another important application. Very often a complex signal is transmitted along a channel. At the receiving end a spectral analysis is made of the received signal to determine the characteristics of the channel. However, because all components of the complex signal may have their frequencies shifted (by the same amount $s$), any resulting spectral analysis is "smeared" and enormous computing capacity is required to compensate for it. In such a case, it is not sufficient simply to measure the frequency shift. What is preferable is to actually shift all components of the complex signal so that what is obtained is a complex signal which is compensated for any frequency shift introduced by the channel. The phase-chasing circuit of FIG. 3 not only provides a measurement $s$ of the frequency shift, but it also restores the received signal so that every frequency component is shifted back to the transmitted frequency. (The circuit also compensates for phase shifts as will be described below.)

The input signal is represented by $$\sum_w A_w \cos (wt)$$

to indicate that it is a summation of many different frequency signals. This complex signal is transmitted along a channel 40 and the output of the channel is represented by $$\sum_w A_w \cos (wt+st),$$

that is, every frequency component in the complex signal has been shifted by the same value $s$. We are not here concerned with the amplitude response; hence, hereinafter variations in $A_w$ are ignored and $A_w$ for every frequency is assumed to be unity.

The complex signal is applied to the input of phase splitter 42. It is broad-band and provides outputs which are in quadrature and of equal magnitudes. Such networks are sold, for example, by Barker & Williamson, Inc. of Bristol, Pa.

The two complex quadrature signals are applied to two of the inputs of resolver 44, and a phase signal $\theta$ is applied to the third input. Resolver 44 functions as does resolver 20 of FIG. 1. Since the resolver is a linear device, each input frequency signal has its phase shifted by the same value $\theta$. It will be recalled that the signal $\theta$ in FIG. 1 equals $st$. There is a problem, of course, in deriving the value $\theta$ from the complex received signal, but assuming that $\theta$ can be derived, the output of the resolver is of the form $$\sum_w \cos (wt+st-\theta)$$

Because a high-gain amplifier 54 is employed in a feedback loop, the signals along the loop are adjusted such that the input to the amplifier is neglible and the output of the amplifier represents the value $st$. Accordingly, the output of resolver 44 is of the form $$\sum_w \cos (wt)$$

—the originally transmitted signal whose subsequent frequency shift has been compensated.

In order to derive the signal $\theta$, the resolver output $$\sum_w \cos (wt+st-\theta)$$

is extended to the input of each of two narrow bandpass filters 46, 48. Each of these filters has a very narrow bandpass depending upon the particular application. For example, in telephony applications the bandpass should be narrow enough to exclude spurious signals.

The bandpass of filter 46 is centered at a frequency $2w_1$. Accordingly, the output of the filter, rather than being a summation of many different frequency signals, is a spectrally pure signal of the form $\cos(2w_1t + st - \theta)$. The bandpass of filter 48 is centered at a frequency $w_1$ so that the output of this filter is a spectrally pure signal $\cos(w_1t + st - \theta)$. Frequency doubler 50 functions to double the frequency of the signal at the output of filter 48. Consequently, the two signals applied to the input of phase comparator 52 are $\cos(2w_1t + st - \theta)$ and $\cos(2w_1t + 2st - 2\theta)$.

Since the output of the phase comparator is coupled to the input of high-gain amplifier 54, the amplifier output assume a value which produces a null at its input. Consequently, the feedback circuit functions to force $(2w_1t + st - \theta)$ to equal $(2w_1t + 2st - 2\theta)$, or $2st - 2\theta = st - \theta$. This, in turn, implies that $\theta = st$. Thus, the net effect of the feedback circuit is to force the $\theta$ input of the resolver to equal $st$, as assumed initially. Furthermore, by providing differentiator 56 to differentiate the output of amplifier 54, the value of the frequency shift $s$ can be derived as shown.

The system of FIG. 3 not only derives a measurement of the frequency shift, but it also compensates the complex received signal so that it does not exhibit the frequency shift introduced by the transmission channel. Although the received signals is complex, by employing two narrow bandpass filters 46, 48 and frequency doubler 50, two spectrally pure signals are derived; the signals differ in frequency by a value $st$ so that the same feedback technique of FIG. 1 can be employed. It should be noted that this technique can be used for an entire multiplexed transmission channel and all sub-channels will thereby have frequency shift compensated out.

The system of FIG. 3 compensates not only for frequency shift along channel 40, but for phase shift as well. This can be demonstrated by resorting to a more complex mathematical analysis.

If a channel introduces a pure time delay, then its phase-frequency characteristic is a straight line which passes through the origin; the time delay of the channel is the slope of the line. Such a channel does not distort a complex signal whose frequency components are within its bandwidth because all frequency components at the channel output have the same relative phases as they had at the channel input. A typical channel differs from the ideal because its phase-frequency characteristic is not straight and it does not pass through the origin.

The phase characteristic of a channel can be expressed as $$\theta = \theta_0 + af + \sum_i k_i \cos(w_i t).$$

The term $af$ is the ideal performance term, in which $a$ is the ideal time delay of the channel. The summation term expresses the non-linearity in phase shift as a function of frequency components, and is known as "envelope delay." In an "equalized" channel, the summation term is reduced to a minimum. The constant term $\theta_0$ is the phase intercept distortion; it reflects an identical phase shift for all frequencies, and is the zero intercept along the phase axis of the phase-frequency plot. Even with a fully equalized channel (i.e., constant envelope delay), if $\theta_0 \neq 0$, the transmitted signal will be distorted. It is for this reason that modems usually transmit information by modulation processes rather than on a baseband basis. (A square wave, for example, which is transmitted as baseband information is unpredictably distorted; but when it is modulated onto a carrier and detected, it yields an undistorted signal within the bandwidth and envelope delay limitations of the channel.) The phase-chasing technique of my invention compensates for phase intercept distortion as well as frequency shift.

In the following analysis, the $af$ term in the phase characteristic function $\theta$ is ignored. This linear term simply represents the ideal time delay of the channel and does not contribute to distortion of the complex signal; this term only "delays" the signal — a physical reality since it takes some finite time for a signal to be transmitted down a channel. The received signal is complex. Each frequency component ($i$) has its phase shifted by a constant value $\theta_0$ plus some value which is a function of the frequency — $\theta(w_i)$. The received signal (ignoring amplitude variations) is thus of the form $$\sum_i \cos(w_i t + st + \theta(w_i) + \theta_0) \tag{1}$$

where $\theta(w_i)$ is the phase shift component unique to frequency $w_i$ through the channel and the phase splitter, and $\theta_0$ is the phase intercept distortion (which may be time variable but is constant for all frequencies). The resolver output is thus $$\sum_i \cos(w_i t + st + \theta(w_i) + \theta_0 - \theta) \tag{2}$$

and the output of filter 46 (whose center frequency is $2w_1$) is $$\cos(2w_1 t + st + \theta(2w_1) + \theta_0 - \theta). \tag{3}$$

The output of filter 48 (whose center frequency is $w_1$) is $$\cos(w_1 t + st + \theta(w_1) + \theta_0 - \theta) \tag{4}$$

and after frequency doubling, the signal applied to the second input of phase comparator 52 is $$\cos(2w_1 t + 2st + 2\theta(w_1) + 2\theta_0 - 2\theta). \tag{5}$$

The feedback loop functions to equalize the arguments of the two inputs of the comparator. Thus, when the arguments of equations (3) and (5) are equated, $$2w_1 t + st + \theta(2w_1) + \theta_0 - \theta = 2w_1 t + 2st + 2\theta(w_1) + 2\theta_0 - 2\theta. \tag{6}$$

This reduces to $$\theta = st + 2\theta(w_1) - \theta(2w_1) + \theta_0 \tag{7}$$

If equation (7) is now substituted in equation (2) to derive the resolver output, it is found that the complex signal at the resolver output is of the form $$\sum_i \cos(w_i t + st + \theta(w_i) + \theta_0 - (st + 2\theta(w_1) - \theta(2w_1) + \theta_0))$$

$$= \sum_i \cos(w_i t + \theta(w_i) - 2\theta(w_1) + \theta(2w_1)). \tag{8}$$

If the frequency term $w_i t$ is ignored, the remainder of expression (8) is the phase of each frequency component $w_i$. The phase of component $w_1$ is $$\theta(w_1) - 2\theta(w_1) + \theta(2w_1) = \theta(2w_1) - \theta(w_1). \tag{9}$$

The phase of component $2w_1$ is $$\theta(2w_1) - 2\theta(w_1) + \theta(2w_1) = 2\theta(2w_1) - 2\theta(w_1)$$
$$= 2[\theta(2w_1) - \theta(w_1)]. \tag{10}$$

Comparing expressions (9) and (10), it is seen that the phase shift for component $2w_1$ is exactly twice that for component $w_1$. This means that, if the phase-frequency curve for an equalized channel is a straight line (i.e., envelope delay is constant), then the line passes through the origin, i.e., there is no phase intercept distortion. This system of FIG. 3 compensates for phase intercept distortion at the same time that it compensates for the channel frequency shift, assuming that at the transmitting end of the channel there is a zero phase difference between the $w_1$ and $2w_1$ frequency components.

Although the invention has been described with reference to particular embodiments, it is to be understood that these embodiments are merely illustrative of the application of the principles of the invention. For example, in the embodiment of FIG. 3, filter 46 could have its center frequency at $3w_1$, with a frequency tripler being substituted for doubler 50; in general, the two inputs to the phase comparator must differ by an integral multiple of $(st - \theta)$. Also, the sensing signal for frequency and phase shift compensation may be a specific waveshape, e.g., a square wave; at the receiving end of the channel the signal may be phase shifted to control proper reproduction of the square wave. The difference between the reference and reproduced waveshapes may be taken as a measure of the lack of equalization of the channel. It is also possible to make all corrections periodically rather than continuously since phase intercept distortion and frequency shift are for the most part slowly varying quantities. Furthermore, the invention is not limited to voiceband channels but has application to higher frequency channels as well. Thus it is to be understood that numerous modifications may be made in the illustrative embodiments of the invention and other arrangements may be devised without departing from the spirit and scope of the invention.

What I claim is:

1. A circuit for deriving a measure of the frequency difference $s$ of two signals of the form $\cos(wt + st)$ and $\cos(wt)$ comprising means for operating upon a signal $\theta$ and said $\cos(wt + st)$ signal to derive a signal of the form $\cos(wt + st - \theta)$, means for comparing the phases of said derived signal and said $\cos(wt)$ signal for producing a signal proportional to the difference in the phases thereof, and high-gain amplifying means for amplifying said produced signal, the output of said high-gain amplifying means being used as said $\theta$ signal such that said high-gain amplifying means forces said produced signal to be nulled so that $\theta = st$.

2. A circuit in accordance with claim 1 wherein said two signals are derived from the output of a transmission channel, the input to said transmission channel being a signal having two frequencies one of which is an integral multiple of the other, said transmission channel functioning to shift each of said two signals by the same frequency, and further including first filter means for transmitting therethrough only the higher-frequency component in the signal received along said transmission channel to derive the first of said two signals, second filter means for transmitting therethrough only the lower-frequency component in the received signal, and means for multiplying the signal transmitted through said second filter means by said integral multiple to derive the second of said two signals.

3. A circuit for compensating the frequency and phase shift introduced by a communication channel of each of many different frequency components in a complex signal, said complex signal after transmission along said communication channel being of the form $$\sum_i \cos(w_i t + st + \theta(w_i)\theta_0),$$

where $s$ is the frequency shift introduced by the communication channel for all frequency components, $\theta(w_i) + \theta_0$ is the phase shift introduced by the communication channel for frequency component $w_i$, and $\theta_0$ is the phase intercept distortion introduced by the communication channel, comprising first means for operating upon said complex signal and a signal $\theta$ to derive a signal of the form $$\sum_i \cos(w_i t + st + \theta(w_i) + \theta_0),$$

second means for operating upon two frequency components in said derived signal one of whose frequencies is an integral multiple of the other to generate two signals whose phases differ, phase comparator means for deriving a signal proportional to the phase difference between said two generated signals, and high-gain amplifying means for amplifying the output of said phase comparator means to derive said $\theta$ signal, whereby the output of said phase comparator means is nulled such that at the output of said first operating means the phase shifts of said two frequency components have a predetermined relationship which is independent of the characteristics of said communication channel and the frequency shift is eliminated in all of said frequency components.

* * * * *